UNITED STATES PATENT OFFICE 2,643,257

SUBSTITUTED SUCCINIMIDES

Charles A. Miller, Detroit, and Loren M. Long, Grosse Pointe Woods, Mich., assignors to Parke, Davis & Company, Detroit, Mich., a corporation of Michigan No Drawing. Application April 12, 1950, Serial No. 155,562

4 Claims. (Cl. 260—326.5)

This invention relates to two new substituted succinimides which possess a remarkably high order of a particularly valuable type of anticonvulsant activity. More particularly, the invention relates to succinimides represented by the formula,

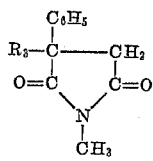

where $R_3$ is lower alkyl such as methyl or ethyl.

In accordance with the invention these succinimides are prepared by the reaction of the appropriately substituted succinic acid with methyl amine; the intermediate reaction product is the di-salt of the acid and the nitrogenous base. This salt upon heating, preferably at about 200–250° C. dehydrates to yield the desired substituted succinimide. The over-all reaction can be illustrated as follows:

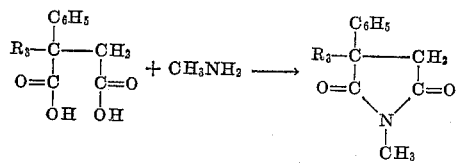

in which $R_3$ has the significance given above.

The products of the invention are particularly useful in the treatment of the petit mal type of epileptic seizures. They are unique in that they are highly effective against this type of convulsion without the production of the undesirable hynotic effects usually associated with other anticonvulsants. The products are also of value in the treatment of the grand mal type of epileptic seizures.

When tested by the standard electro-shock methods of Putnam et al. (Science, 85, 525 (1937)) utilizing cats and that of Toman et al. (J. Neurophysiol., 9, 231 (1946)) utilizing mice, the products of the invention exhibit a high degree of anticonvulsant activity as shown in the table. As will also be seen from the table the products of the invention show a high degree of activity in the so-called "anti-metrazol test" for the petit mal type of convulsion. This test is performed by feeding five rats weighing 150–200 g. each a predetermined quantity of the drug to be tested, followed in one-half hour by the subcutaneous injection of 93 mg./kg. (95–100% of the convulsive dose) of metrazol (pentamethylene tetrazole). The rating of the drug is based on the number of the five rats which are protected from convulsions within the half hour following the injection of the metrazol, a 4+ rating indicating the protection of all five animals.

TABLE

| $R_3$ | Electro-shock, Cat Test | | Electro-shock Mouse Test— Dose of Drug (mg./kg.) which protects 50% of the test mice from convulsions | Anti-Metrazol Test | |
|---|---|---|---|---|---|
| | Rating | Dose Level, mg./kg. | | Rating | Dose Level, mg./kg. |
| $C_2H_5$ | | | ca. 100 | 4+ | 33 |
| | | | | 1+ | 16 |
| $CH_3$ | 1+ | 100 | ca. 120 | 4+ | 65 |
| | | | | 3+ | 33 |
| | | | | 1+ | 16 |

These compounds are quite non-toxic. For example, for N-methyl-α,α-methylphenylsuccinimide, the M. T. D. is 900 mg./kg. and the $LD_{50}$ is 1550 mg./kg. for single massive doses perorally in mice. No cumulative toxic effect in mice and dogs is noticed. α-Ethyl-N-methyl-α-phenyl-succinimide produces moderate depression at 500 mg./kg. In general, these compounds are non-toxic, produce no cumulative toxic effect and have no toxic effect on the hematologic system.

The invention is illustrated by the following examples:

Example 1

10 g. of α-phenyl-α-ethylsuccinic acid and 10 g. of 40% aqueous methyl amine are heated together at 200–250° C. until no more disillate is obtained. The resulting residue is then vacuum distilled. The N-methyl-α-phenyl-α-ethylsuccinimide, which has a boiling point of 122–123° C. at 0.1 mm. has the following structure

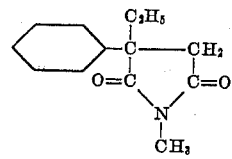

Example 2

100 g. of α-phenol-α-methylsuccinic acid and 110 g. of 40% aqueous methyl amine are heated together at 200–250° C. until no more distillate is obtained. Upon vacuum distillation of the residue, the N-methyl-α-phenyl-α-methylsuccinimide, of boiling point 121–122° C. at 0.1 mm. is obtained. After recrystallization from aqueous ethanol, this compound melts at 52–53° C. and has the formula

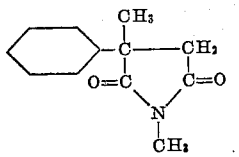

Attention is directed to a copending application filed September 26, 1952, Serial No. 311,798, which is in part a continuation of the instant application and which discloses related chemical compounds useful in the treatment of the petit mal type of epileptic seizures.

What we claim is:

1. A compound of the formula

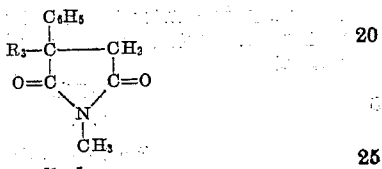

wherein $R_3$ is lower alkyl.

2. N-methyl-α-phenyl-α-ethylsuccinimide.
3. N-methyl-α-phenyl-α-methylsuccinimide.
4. A therapeutic agent consisting of a composition in dosage unit form comprising N-methyl-α-phenyl-α-ethylsuccinimide in nontoxic amount effective against epileptic convulsions.

CHARLES A. MILLER.
LOREN M. LONG.

References Cited in the file of this patent

FOREIGN PATENTS

| Number | Country | Date |
|---|---|---|
| 389,948 | Germany | Aug. 1, 1922 |